Nov. 7, 1944.  J. B. CRAWFORD  2,362,356
FRUIT HUSKING MACHINE
Filed Sept. 22, 1942  2 Sheets-Sheet 1
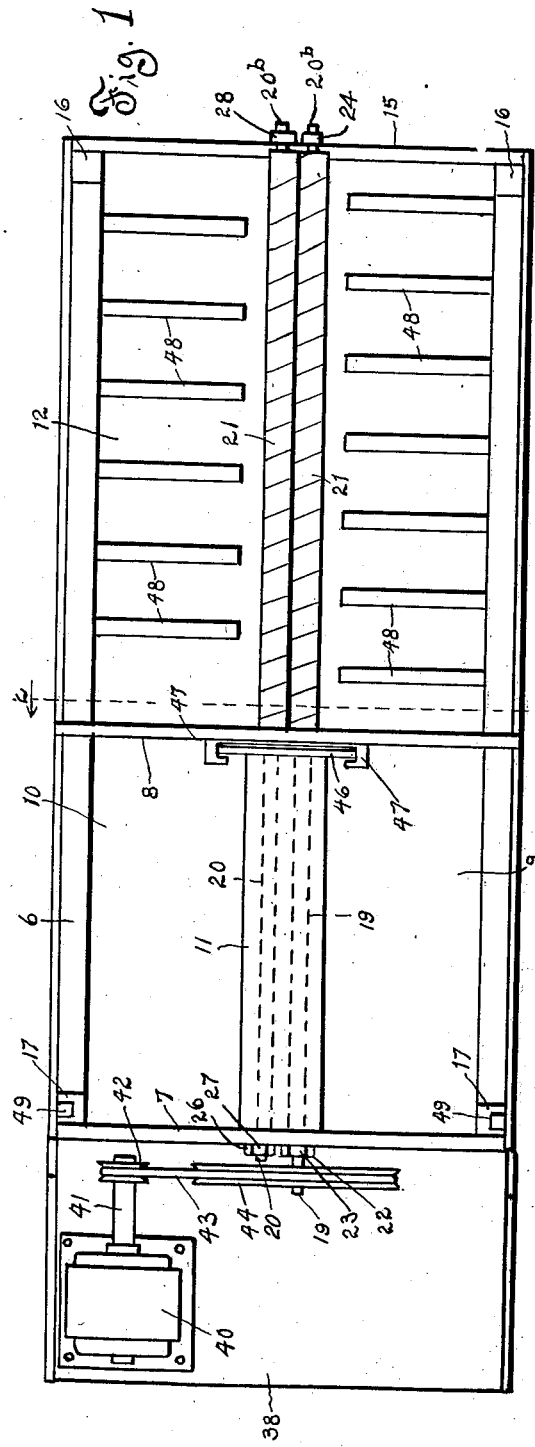
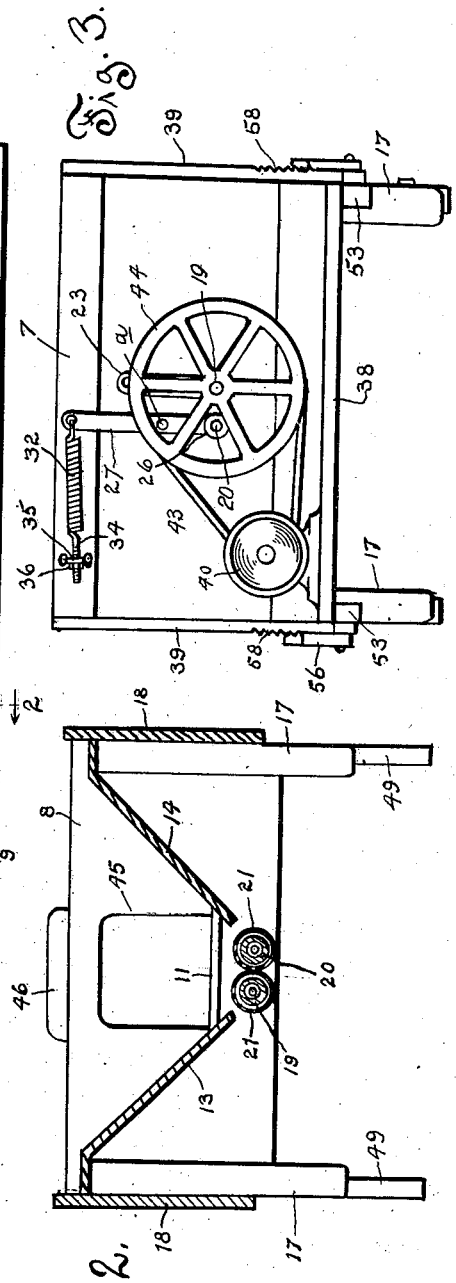
Inventor
James Bryant Crawford.
Walter N. Haskell.
By
his Attorney.

Nov. 7, 1944.                J. B. CRAWFORD                2,362,356
                            FRUIT HUSKING MACHINE
                     Filed Sept. 22, 1942          2 Sheets-Sheet 2
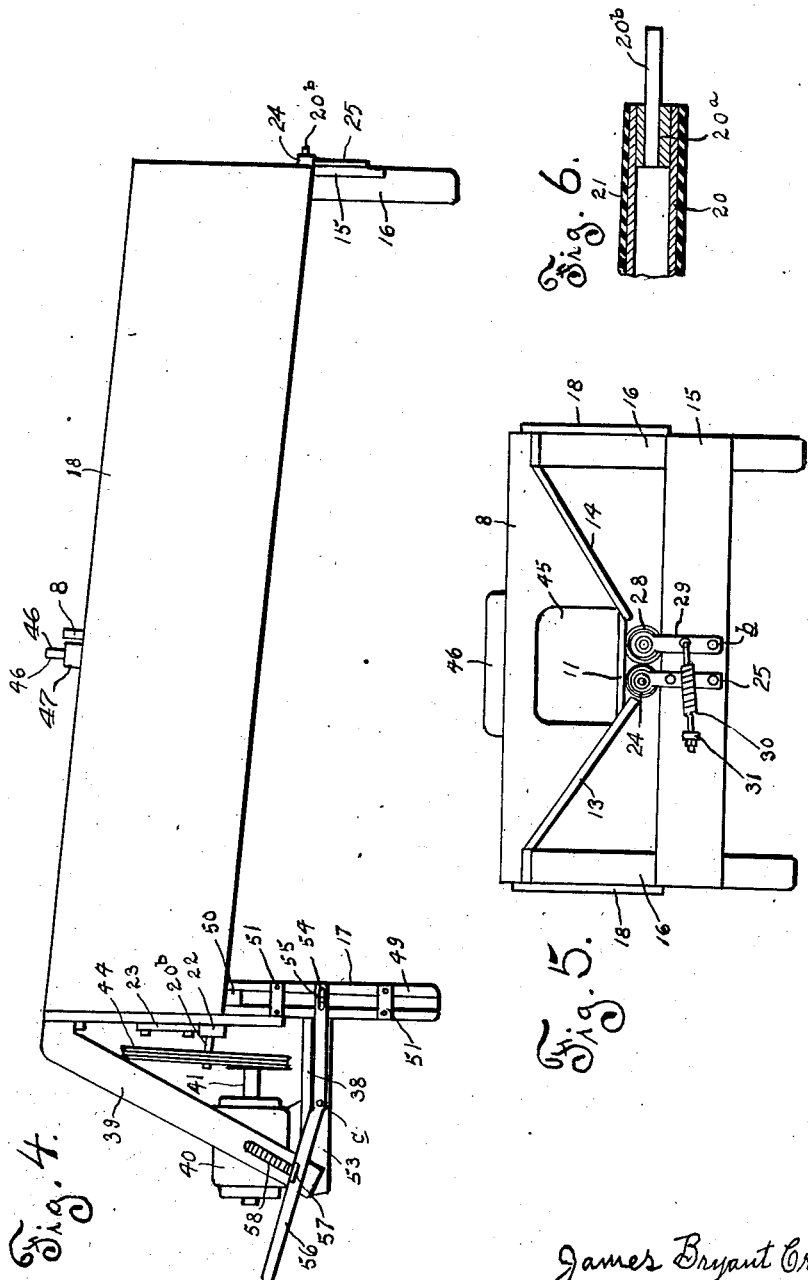
Inventor
James Bryant Crawford.
By Walter N. Haskell
his Attorney Patented Nov. 7, 1944

2,362,356

UNITED STATES PATENT OFFICE 2,362,356

FRUIT HUSKING MACHINE

James Bryant Crawford, Moline, Ill., assignor of one-half to L. O. Morford, Fort Dodge, Iowa Application September 22, 1942, Serial No. 459,271

3 Claims. (Cl. 209—2)

My invention has reference to a fruit husking machine, and has more special relation to a mechanical device by means of which paper wrappers on oranges, apples, and similar fruit can be removed with a great saving of labor and time.

It is a well-known fact that in many large business houses, such as super-markets dealing in food supplies, large quantities of the fruit mentioned, also lemons, grape-fruit and the like, are contained in thin wrappers, in the nature of artificial husks, which it is advisable to have removed before placing the fruit on sale. This calls for the employment of several extra men or boys, and frequently makes inroads upon the time of employees who are needed for some other work. By the use of the present invention, and with the assistance of a single workman, a large quantity of fruit can be expeditiously and efficiently deprived of its wrappings, and without injury to the fruit. A box of fruit of usual shipping proportions can be dumped into the machine at one point, and almost instantly refilled with the stripped fruit at another point.

The use of the machine is not limited to the unwrapping of fruit, however, but it is found to operate quite effectually in removing the outer husks from some kinds of vegetables, such as onions, which are of a more or less globular form.

The above named, and other features and advantages of the invention will more fully appear from the following specification, reference being had to the accompanying drawings, in which:

Fig. 1 is a plan view of the invention.

Fig. 2 is a cross-section on the broken line 2—2 of Fig. 1.

Fig. 3 is an end view looking from the left of Fig. 1.

Fig. 4 shows the invention in side elevation.

Fig. 5 is an end view looking from the right of Fig. 1.

Fig. 6 is a fragmentary detail, showing one end of the shaft 20.

The machine is of a long, trough-like appearance, and includes near one of its ends a hopper 6, and is fitted with downwardly sloping floor pieces 9 and 10, with a central bottom board 11. In line with the hopper 6 is a receptacle or chute 12, having similar sloping floors 13 and 14, extending from the partition 8 to an open end of the machine just above a cross-piece 15, uniting a pair of corner-posts 16, which are connected with a pair of similar posts 17 by side-boards 18, attached thereto. The posts 17 are of greater length than the posts 16, as clearly shown in Fig. 4, by which means the hopper and chute compartments are given a considerable incline toward the open end of the machine.

In the chute compartment the adjacent edges of the floors 13 and 14 are spaced from each other to accommodate a pair of parallel shafts 19 and 20, each of which is provided within the chute 12 with a covering 21 of gripping material, such as semi-soft rubber or the like. Said shafts extending for the length of the machine, are supported for rotation at their ends, the shaft 19 in a bearing 22 at its upper end, on an arm 23 fixed to the end-piece 7, and at its lower end in a bearing 24 on an arm 25 fixed to the cross-piece 15. The shaft 20 is supported at its upper end by a bearing 26 on an arm 27, having a pivotal connection with the end-piece 7 as at a, and at the lower end in a bearing 28 on an arm 29, pivoted to the cross-piece 15 as at b. The ends of the shafts 19 and 20 are preferably constructed in the manner shown in Fig. 6, plugs 20a being driven into the ends of both of said shafts, with central openings to receive reduction shafts or pins 20b, which smaller shafts are journalled in the respective bearings.

The arm 29 is connected by a coiled spring 30 with a post 31, serving to assist in holding the shaft 20 yieldably in close proximity to the shaft 19. The other end of the shaft 20 is held in a similar yieldable position by a coiled spring 32, connecting the arm 27 with the end piece 7. Said spring is formed into a rod extension 34, passing through an eye 35 on the piece 7, and threaded on its end to receive a nut 36. By turning said nut the tension of the spring 32 can be adjusted.

Projecting from the hopper end of the machine is a shelf 38, supported by arms 39, upon which shelf is mounted an electric motor 40, on the shaft 41 of which is a pinion 42, connected by a belt 43 with a sheave 44 on the upper end of the shaft 19. Upon the motor being operated the shaft 19 is caused to revolve inwardly and downwardly, the friction between said shaft and the shaft 20 in the chute 12 causing the latter shaft to rotate in the opposite direction.

Centrally of the partition 8 is an opening 45, with a closure therefor consisting of a shutter or gate 46, slidable vertically in guides 47 fixed to the partition 8 on the hopper side thereof.

A quantity of fruit, such as oranges, with the wrappers on, is dumped into the hopper 16 with the gate 46 closed, which gate is then opened, permitting the movement of the fruit into the chute part of the machine. This movement may be assisted manually, and after passing through the opening the fruit continues on a downward rolling movement, assisted by the force of gravity, with a tendency of the fruit to work toward the center of the trough, and over the rollers. At this point the wrappers are drawn between the rolls, leaving the fruit entirely clean by the time it reaches the point of discharge at the open end of the chute. In case of a tendency of the fruit to move downwardly too rapidly the floors 13 and 14 may be fitted with retarding elements, consisting of laterally disposed slats 48, of approximately one-half inch in thickness, with which the rolling balls of fruit come in contact, directing them toward the center.

A greater efficiency in operation is shown by wrapping the outer covering of the rolls in spiral fashion the edges of the several winds of wrapping material tending to retard the downward movement of the fruit, the various units of which are also spun about by the rotation of the rolls, until some portion of the fruit wrapper becomes caught in the rolls, and propelled downwardly therethrough.

In using the machine with dry vegetables, such as onions, the outer husks are drawn downwardly between the rollers as in the case of the wrappers, and the accumulation of such husks, or of the paper wrappers, can be removed from below the machine. If desired, suitable receptacles can be placed beneath the machine, to catch the rubbish passing downwardly between the rolls.

It is sometimes desired to give a greater or less amount of incline to the machine, and this can be done by means of extension legs 49 slidable vertically in channels 50 in the outer faces of the posts 17, and held from release by metal straps 51, attached to the posts. A lever 52 is pivoted to the frame as at c, one end of which is connected with the leg 49 by means of a slot 54 in the end of the lever, engaging a pin 55 in the leg. At its outer end the lever is provided with a handle 56, at one point on which is a detent blade 57, for engagement with the corrugations in a plate 58 on the arm 39. By lifting on the handle 56 the leg 49 is extended downwardly, elevating the post 17, and held in adjusted position by engagement of the detent with one of the corrugations. This lever arrangement is duplicated at the other side of the machine, so that the posts 17 can be raised or lowered together.

For operation, one of the machines can be placed conveniently to the fruit receiving department of a store, and by its use a considerable number of boxes of fruit can be relieved of their wrappers in a short space of time, and with the help of a single attendant, whose duties will be devoted chiefly to dumping the boxes of fruit into the hopper and removing the refilled boxes at the fruit receiving end of the machine. This end is of sufficient height to enable one of the empty boxes to be placed cross-ways at the end, to be filled again with the fruit as it rolls from the machine.

The machine is of a simple and durable construction, and functions perfectly in actual practice. It will be apparent that it is designed for use only with those kinds of fruit which are of globular form and will have a tendency to move downwardly along an inclined surface of their own volition.

What I claim and desire to secure is:

1. A fruit wrapper husking machine, embodying a frame, a chute supported therein in an inclined position, and provided in its bottom with a longitudinal opening, a pair of closely spaced parallel rolls supported in said opening, means for rotating the rolls in opposite directions with the upper portions moving toward each other, one of said rolls having means permitting a yieldable movement thereof with relation to the other roll, to discharge wrappers between the rolls, and spirally disposed rubber wrappings on said rolls extending in a direction to retard the movement of wrapped oranges and the like being fed down the chute, and give a spinning movement thereto, and remove the wrappers from said fruit.

2. A fruit wrapper husking machine, embodying a frame, a chute supported therein in an inclined position, and provided in its bottom with a longitudinal opening, a pair of closely spaced parallel rolls supported in said opening, means for rotating the rolls in opposite directions with the upper portions moving toward each other, to discharge wrappers between the rolls, and spirally disposed rubber wrappings on said rolls extending in a direction to retard the movement of wrapped oranges and the like being fed down the chute, and give a spinning movement thereto, and remove the wrappers from said fruit.

3. A fruit wrapper husking machine, comprising a suitable frame, an inclined box supported by said frame, a hopper in the upper end of said box adapted to receive the fruit contents of a container of given capacity at one time, a trough-shaped chute in the other end of said box provided in its bottom with a longitudinal opening, and communicating with said hopper through a throat restricting the flow of fruit into said chute by force of gravity, with the fruit returnable by gravity into the original container at the lower end of the chute, a pair of closely spaced parallel rolls supported in said longitudinal opening, means for rotating said rolls in opposite directions with the upper portions moving toward each other, one of said rolls having means permitting a yieldable movement thereof with relation to the other roll, to discharge wrappers between the rolls, and spirally disposed rubber wrappings on said rolls extending in a direction to retard the movement of wrapped oranges and the like being fed down the chute, and give a spinning movement thereto, and remove the wrappers from the fruit.

JAMES BRYANT CRAWFORD.